(12) United States Patent
Tagami et al.

(10) Patent No.: US 10,681,244 B2
(45) Date of Patent: Jun. 9, 2020

(54) IMAGE FORMING APPARATUS CROPPING A PLURALITY OF IMAGE DATA

(71) Applicant: KYOCERA Document Solutions Inc., Osaka (JP)

(72) Inventors: Yuya Tagami, Osaka (JP); Sachiko Shintani, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/510,520

(22) Filed: Jul. 12, 2019

(65) Prior Publication Data

US 2020/0028985 A1 Jan. 23, 2020

(30) Foreign Application Priority Data

Jul. 20, 2018 (JP) .................................. 2018-136908

(51) Int. Cl.
*H04N 1/387* (2006.01)
*H04N 1/38* (2006.01)

(52) U.S. Cl.
CPC ............. *H04N 1/38* (2013.01); *H04N 1/3873* (2013.01); *H04N 2201/0091* (2013.01)

(58) Field of Classification Search
CPC .... H04N 1/00167; H04N 1/38; H04N 1/3872; H04N 1/3873
See application file for complete search history.

(56) References Cited

U.S. PATENT DOCUMENTS

| | | | | |
|---|---|---|---|---|
| 6,956,587 B1* | 10/2005 | Anson | .................. | H04N 1/3873 345/619 |
| 7,010,745 B1* | 3/2006 | Shimada | ................... | G06T 5/20 382/176 |
| 8,213,687 B2* | 7/2012 | Fan | ..................... | H04N 1/00681 382/112 |
| 8,619,314 B2* | 12/2013 | Bannai | ................. | H04N 1/0071 358/1.12 |
| 8,913,087 B1* | 12/2014 | Kejriwal | ................ | G09G 5/227 345/173 |
| 2006/0221411 A1 | 10/2006 | Aoki | ............................. | 358/474 |
| 2019/0141213 A1* | 5/2019 | Mizude | ................ | H04N 1/3873 |

FOREIGN PATENT DOCUMENTS

JP 2006-287360 A 10/2006

* cited by examiner

*Primary Examiner* — Scott A Rogers
(74) *Attorney, Agent, or Firm* — Stein IP, LLC

(57) ABSTRACT

An image forming apparatus includes an image reader unit and a control unit. The image reader unit generates read data. The control unit generates output data of image data cropped from the read data. When cropping a plurality of image data, the control unit sets one side of the read data to a first reference side and sets another side perpendicular to the first reference side to a second reference side, and for each of the plurality of image data, the control unit detects a first distance between the first reference side and the image data in a direction parallel to the second reference side, and a second distance between the second reference side and the image data in a direction parallel to the first reference side, and sets an output order of the plurality of image data based on the first distances and the second distances.

10 Claims, 12 Drawing Sheets

IMAGE FORMING APPARATUS CROPPING A PLURALITY OF IMAGE DATA

INCORPORATION BY REFERENCE

This application is based upon and claims the benefit of priority from the corresponding Japanese Patent Application No. 2018-136908 filed Jul. 20, 2018, the entire contents of which are hereby incorporated by reference.

BACKGROUND

The present disclosure relates to an image forming apparatus that outputs image data of a read document.

Conventionally, there is known an image forming apparatus having an automatic crop function.

When a plurality of documents are read at the same time, a conventional image forming apparatus generates read data including a plurality of image data corresponding to the plurality of documents, respectively. Then, the conventional image forming apparatus crops each of the plurality of image data from the read data (performs multi-cropping). In this way, when a plurality of documents are read at the same time, a plurality of image data respectively corresponding to the plurality of documents can be divided into a plurality of pages to be output.

SUMMARY

An image forming apparatus according to one aspect of the present disclosure includes an image reader unit and a control unit. The image reader unit reads a document placed on a contact glass so as to generate read data including image data of the document. The control unit performs a cropping process of cropping the image data from the read data so as to generate output data of the image data cropped in the cropping process. When performing, as the cropping process, a first process in which a plurality of image data are cropped from the read data, the control unit sets one side of the read data to a first reference side and sets another side perpendicular to the first reference side of the read data to a second reference side, and for each of the plurality of image data, the control unit detects a first distance between the first reference side and the image data in a direction parallel to the second reference side, and a second distance between the second reference side and the image data in a direction parallel to the first reference side, and sets an output order of the plurality of image data based on the first distances and the second distances of the plurality of image data.

DETAILED DESCRIPTION

Hereinafter, an image forming apparatus according to one embodiment of the present disclosure is described with an example of a multifunction peripheral having a plurality of types of functions such as a scanner function and a printer function.

<Structure of Apparatus>

Figure 1:
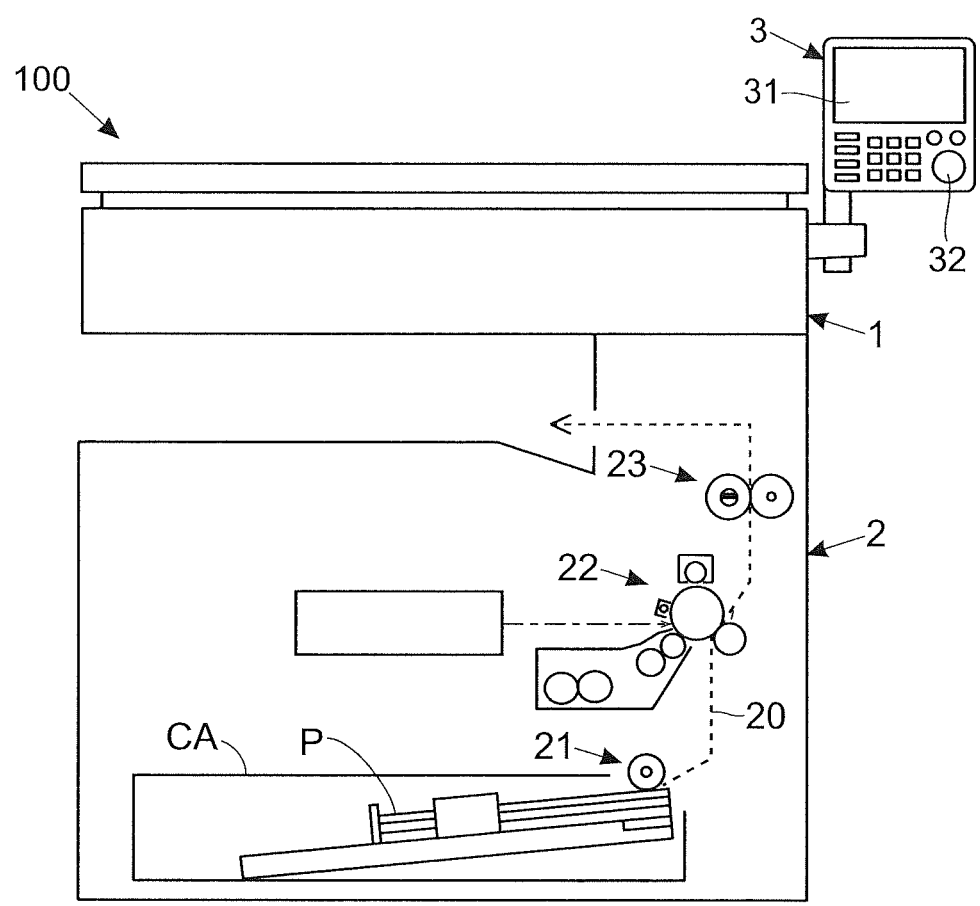
FIG. 1 is a schematic diagram illustrating a structure of an image forming apparatus according to one embodiment of the present disclosure.

As illustrated in FIG. 1, an image forming apparatus 100 of this embodiment includes an image reader unit 1 and a printing unit 2. The image reader unit 1 reads documents D (see FIG. 2). The printing unit 2 prints an image on a paper sheet P.

Figure 2:
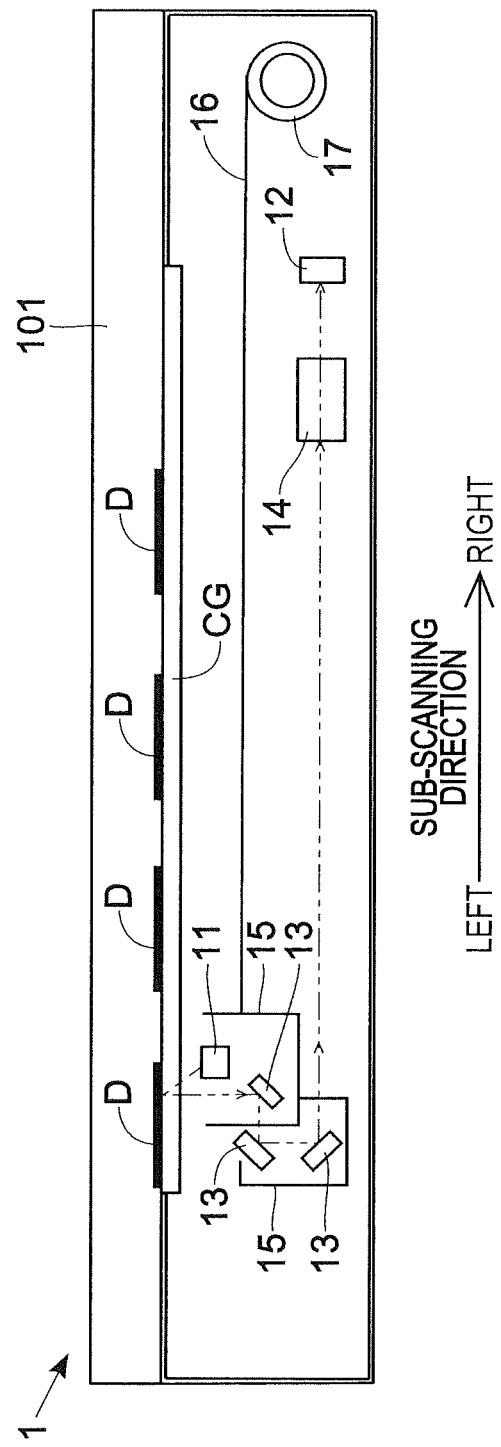
FIG. 2 is a schematic diagram illustrating a structure of an image reader unit of the image forming apparatus according to the one embodiment of the present disclosure.

As illustrated in FIG. 2, the image reader unit 1 has a contact glass CG. The contact glass CG is disposed at an opening formed on an upper surface of a casing of the image reader unit 1. The image reader unit 1 reads the documents D placed on a placing surface of the contact glass CG so as to generate read data including image data of the read documents D. Note that FIG. 2 illustrates a state where the plurality of documents D to be read are placed on the contact glass CG. When the plurality of documents D as reading targets are placed on the contact glass CG in this way and the image reader unit 1 performs reading in this state, the image reader unit 1 generates read data including a plurality of image data respectively corresponding to the plurality of documents D placed on the contact glass CG.

In addition, the image reader unit 1 includes a light source 11, an image sensor 12, mirrors 13, and a lens 14. These members of the image reader unit 1 are housed in the casing of the image reader unit 1 (disposed on the opposite side of the placing surface side of the contact glass CG).

The light source 11 includes a plurality of LED elements (not shown). The plurality of LED elements are arranged in the main scanning direction (the direction perpendicular to the paper plane of FIG. 2). The light source 11 emits light toward the contact glass CG. The light from the light source 11 passes through the contact glass CG. In an area where the document D is placed, the light from the light source 11 is reflected by the document D.

The image sensor 12 includes a plurality of photoelectric conversion elements arranged in the main scanning direction. The image sensor 12 receives the light reflected by the document D. When receiving light, the image sensor 12 performs photoelectric conversion for each pixel per line so as to accumulate charge and outputs a signal corresponding to the accumulated charge.

The mirrors 13 reflect the light reflected by the document D toward the lens 14. The lens 14 condenses the light reflected by the mirrors 13 and guides the light to the image sensor 12.

The light source 11 and the mirrors 13 are disposed in a movable frame 15 that can move in a sub-scanning direction perpendicular to the main scanning direction. The movable frame 15 is connected to a wire 16. The wire 16 is wound around a winding drum 17. When the winding drum 17 rotates, the movable frame 15 moves in the sub-scanning direction. In other words, the light source 11 and the mirrors 13 are moved in the sub-scanning direction.

When executing a job (such as a copy job or a transmission job) accompanied with reading by the image reader unit 1, the movable frame 15 moves in the sub-scanning direction (a direction from left to right viewed from front). While the movable frame 15 is moving in the sub-scanning direction, the light source 11 emits light toward the contact glass CG. In addition, the image sensor 12 repeatedly performs photoelectric conversion of the reflected light reflected by the document D. In this way, reading of the document D is performed per line.

Note that a document cover 101 is attached to the casing of the image reader unit 1. The document cover 101 is opened and closed with respect to the placing surface of the contact glass CG. By closing the document cover 101 in a state where the document D is placed on the contact glass CG, the document D on the contact glass CG can be pressed by the document cover 101. FIG. 2 illustrates a state where the documents D on the contact glass CG are pressed by the document cover 101.

With reference to FIG. 1 again, the printing unit 2 conveys the paper sheet P along a sheet conveying path 20 and prints an image on the paper sheet P that is being conveyed. In FIG. 1, the sheet conveying path 20 is shown by a broken line. In a copy job, the printing unit 2 prints an image on the paper sheet P based on image data of the document D. The printing unit 2 includes a sheet feeding unit 21, an image forming unit 22, and a fixing unit 23.

The sheet feeding unit 21 supplies the paper sheet P stored in a sheet cassette CA to the sheet conveying path 20. The paper sheet P supplied to the sheet conveying path 20 is conveyed along the sheet conveying path. The image forming unit 22 forms a toner image (an image) and transfers (prints) the toner image onto the paper sheet P that is being conveyed. The paper sheet P with the transferred image is conveyed to the fixing unit 23. The fixing unit 23 heats and presses the paper sheet P with the transferred image so that the toner image is fixed onto the paper sheet P.

In addition, the image forming apparatus 100 is equipped with an operation panel 3. The operation panel 3 includes a touch screen 31. The touch screen 31 displays a screen including software buttons, and receives a touch operation to a display screen (a software button) by a user.

The operation panel 3 also includes a hardware button 32. A plurality of hardware buttons 32 are disposed. The hardware buttons 32 includes, for example, a start button for receiving a start operation that requests to execute a job accompanied with reading by the image reader unit 1 from the user.

Figure 3:
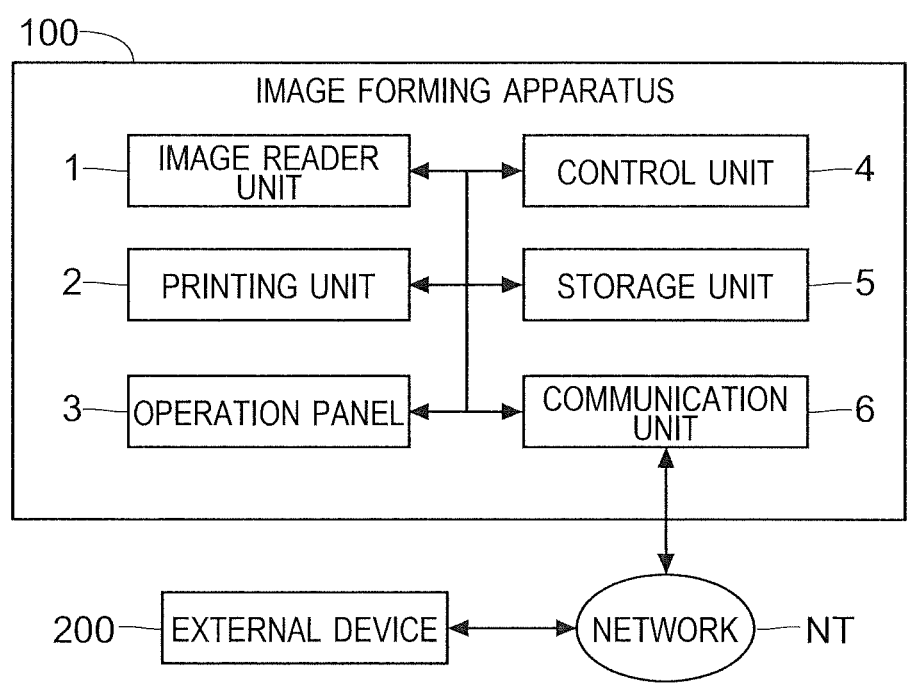
FIG. 3 is a block diagram illustrating a structure of the image forming apparatus according to the one embodiment of the present disclosure.

In addition, as illustrated in FIG. 3, the image forming apparatus 100 includes a control unit 4. The control unit 4 includes a CPU. The control unit 4 operates based on a control program and control data so as to control operations of individual units of the image forming apparatus 100.

The image reader unit 1, the printing unit 2, and the operation panel 3 are connected to the control unit 4. The control unit 4 controls reading operation of the image reader unit 1 and controls printing operation of the printing unit 2. In addition, the control unit 4 controls display operation of the operation panel 3 and detects operation performed to the operation panel 3.

In addition, the image forming apparatus 100 includes a storage unit 5. The storage unit 5 includes a ROM, a RAM, and the like. The storage unit 5 stores a control program and control data. The storage unit 5 is connected to the control unit 4. The control unit 4 reads out information from the storage unit 5 and writes information into the storage unit 5.

In addition, the image forming apparatus 100 includes a communication unit 6. The communication unit 6 is an interface for connecting the image forming apparatus 100 to a network NT such as a LAN or the Internet. The communication unit 6 includes a communication circuit, a communication memory, a communication connector, and the like. An external device 200 is connected to the network NT. The external device 200 is a personal computer (a user terminal used by the user of the image forming apparatus 100), an external server, or a facsimile machine. When the image forming apparatus 100 is connected to the network NT, it can perform the transmission job.

The communication unit 6 is connected to the control unit 4. The control unit 4 uses the communication unit 6 so as to communicate with the external device 200 (transmit and receive data with the external device 200). In the transmission job, the image forming apparatus 100 transmits data (e.g. the image data of the document D) to the external device 200.

<Automatic Crop Function>

(Outline)

The image forming apparatus 100 has an automatic crop function. The operation panel 3 receives from the user an operation instructing to enable or disable the automatic crop function. When receiving an instruction to enable the automatic crop function, the control unit 4 sets the automatic crop function to be enabled.

In the state where the automatic crop function is set to be enabled, when the operation panel 3 receives from a user a request to execute a job (such as a copy job or a transmission job) accompanied with reading by the image reader unit 1, the control unit 4 sets a reading range of the image reader unit 1 to a predetermined maximum range (a reading range when reading a document D of a maximum size). In this way, the substantially entire surface of the placing surface of the contact glass CG is the reading range. After setting the reading range, the control unit 4 controls the image reader unit 1 to perform reading.

When the image reader unit 1 finishes reading, the control unit 4 obtains read data. Then, the control unit 4 performs a process concerning the automatic crop function (hereinafter referred to as a cropping process). The control unit 4 performs a process of automatically cropping image data of the document D (hereinafter referred to as document image data) from the read data, as the cropping process.

When performing the cropping process, the control unit 4 recognizes a document region (a region having an image of the document D) in the read data. For instance, the control unit 4 performs an edge detection process on the read data so as to detect contour lines of the document D (edge pixels constituting the contour lines), and recognizes the region enclosed by the detected contour lines as the document region. Then, the control unit 4 crops from the read data the data inside the document region in the read data as the document image data.

After that, the control unit 4 generates output data of the document image data cropped in the cropping process, and performs an output process to output the document image data. If the job that is requested to execute is the copy job, the image based on the document image data is printed (output) on the paper sheet P. If the job that is requested to execute is the transmission job, the document image data is transmitted (output) to the external device 200.

When generating the output data, the control unit 4 performs various types of image processing (correction processes) on the document image data. For instance, the control unit 4 performs a rotation process on the document image data so as to correct inclination of the document image data. In addition, the control unit 4 scales the document image data in accordance with an output page size. Note that it is possible to perform a process for adjusting contrast or brightness of the image, or distortion of the image on the document image data.

The automatic crop function is used in a job accompanied with reading of a card type document D such as a driver's license card, an insurance card, or a business card (hereinafter referred to as a card document D). When the automatic crop function is used, the following process can be performed.

For instance, it is supposed that a plurality of card documents D are read at the same time. In this case, a plurality of document image data respectively corresponding to the plurality of card documents D are cropped. In this way, the document image data of the plurality of card documents D read at the same time can be divided into a plurality of pages to be output.

In addition, it is supposed that front and back sides of a card document D are read individually. In this case, document image data corresponding to the front side of the card document D and document image data corresponding to the back side of the card document D are cropped. In this way, the document image data of the front and back sides of the card document D, which are read individually, can be aggregated into one page to be output.

Here, modes of the automatic crop function include a multi-cropping mode and a single cropping mode. The operation panel 3 receives from a user an operation to select a mode of the automatic crop function. When the multi-cropping mode is selected as the automatic crop function mode, the document image data of the plurality of card documents D read at the same time can be divided into a plurality of pages to be output, for example. When the single cropping mode is selected as the automatic crop function mode, the document image data of the front and back sides of the card document D, which are read individually, can be aggregated into one page to be output, for example.

If the automatic crop function mode is the multi-cropping mode, the control unit 4 performs a first process as the cropping process. On the other hand, if the automatic crop function mode is the single cropping mode, the control unit 4 performs a second process as the cropping process.

In the following description, the read data is denoted by symbol R, and the document image data included in the read data R is denoted by symbol G.

(First Process)

Figure 4:
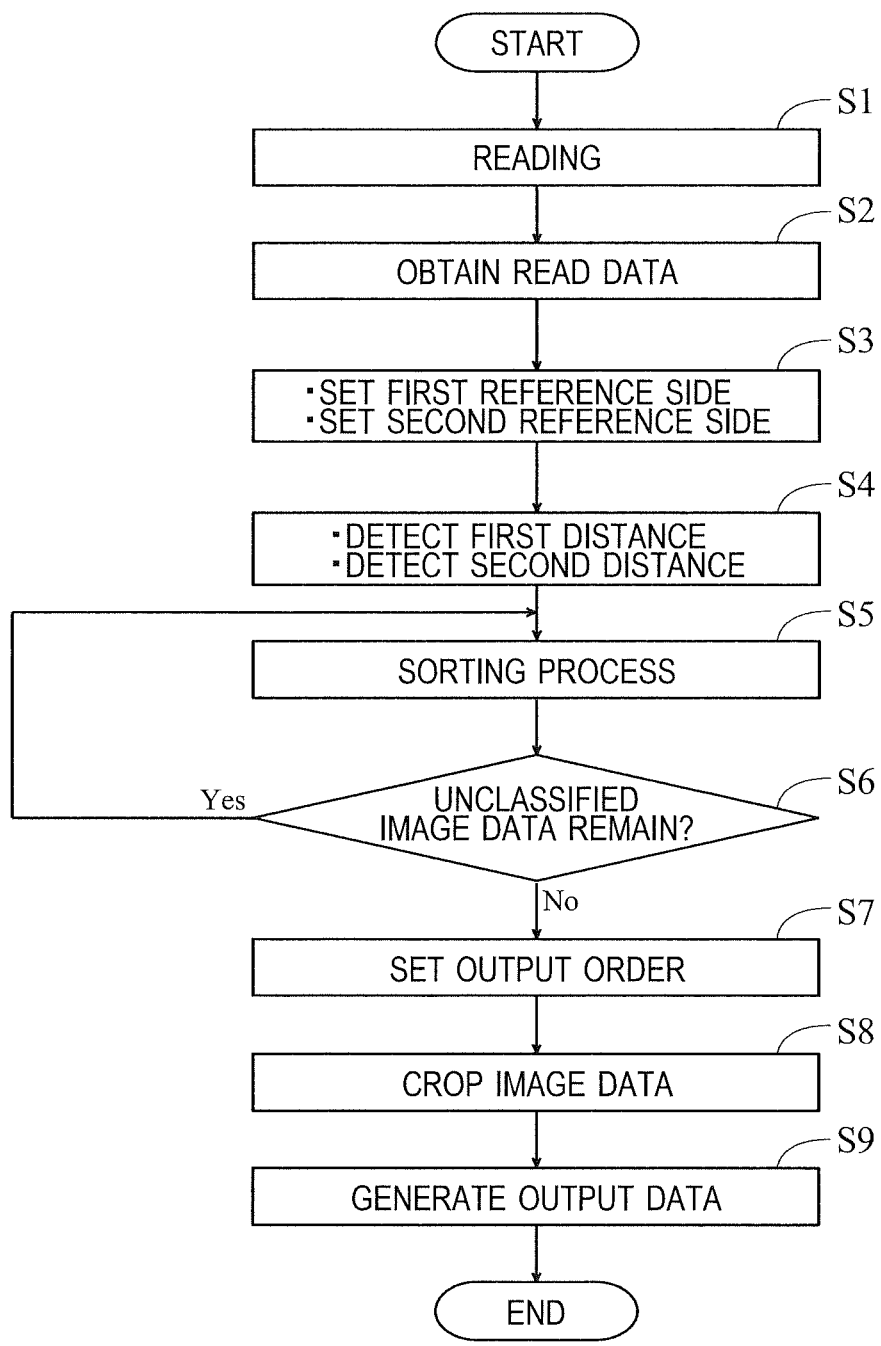
FIG. 4 is a flowchart illustrating a flow of a first process performed by a control unit of the image forming apparatus according to the one embodiment of the present disclosure.

With reference to the flowchart shown in FIG. 4, a flow of the first process performed by the control unit 4 is described below. It is supposed that the automatic crop function is enabled when the flowchart shown in FIG. 4 starts. In addition, it is supposed that the multi-cropping mode is selected as the automatic crop function mode. In this state, when the operation panel 3 receives a request to execute a job from the user, the flowchart shown in FIG. 4 starts. Further, it is supposed that a plurality of (sixteen) card documents D are placed on the contact glass CG when the flowchart shown in FIG. 4 starts.

In Step S1, the control unit 4 controls the image reader unit 1 to read the plurality of card documents D. After that, in Step S2, the control unit 4 obtains the read data R (see FIG. 5) obtained by reading by the image reader unit 1. The read data R obtained by the control unit 4 at this time includes a plurality of document image data G respectively corresponding to the plurality of card documents D placed on the contact glass CG (see FIG. 5).

Figure 5:
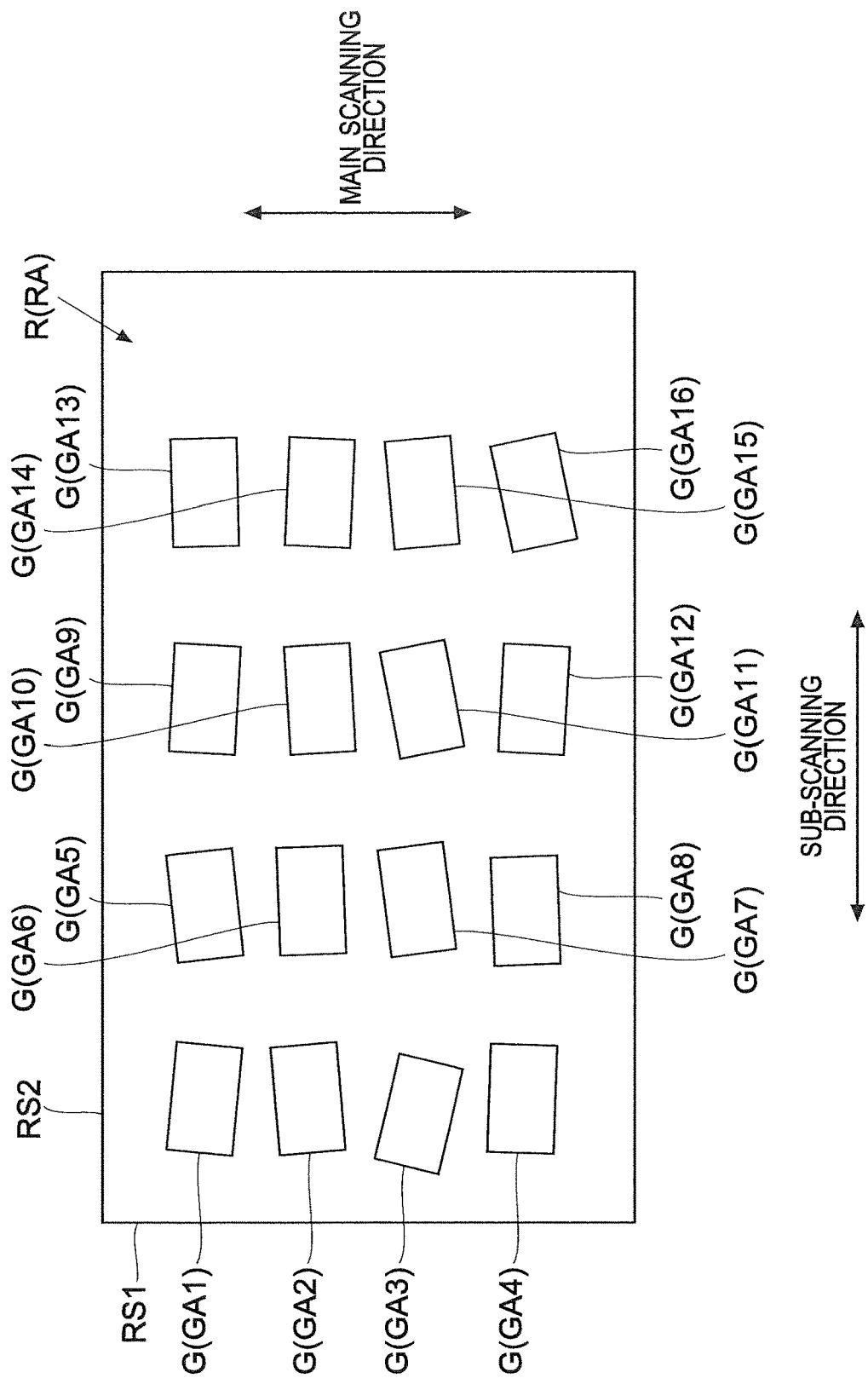
FIG. 5 is a diagram illustrating one example of read data generated by the image reader unit of the image forming apparatus according to the one embodiment of the present disclosure (an explanatory diagram of the first process).

In the following description, the read data R obtained at this time is denoted by symbol RA. In addition, the plurality of document image data G in the read data RA may be denoted by symbols GA1 to GA16 for description. FIG. 5 shows the read data RA.

Figure 6:
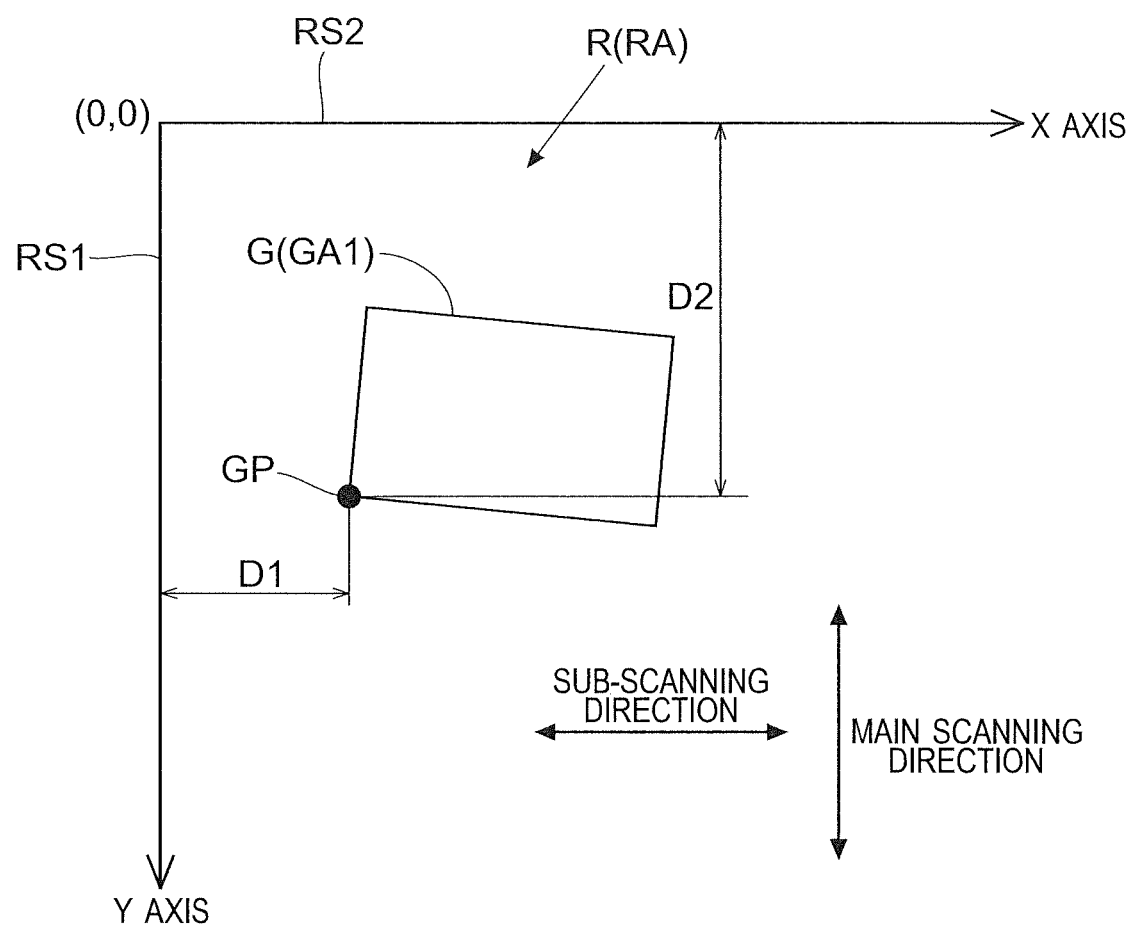
FIG. 6 is an explanatory diagram about a first distance detection process and a second distance detection process performed by the control unit of the image forming apparatus according to the one embodiment of the present disclosure.

In Step S3, the control unit 4 sets one side of the read data RA to a first reference side RS1 (see FIG. 6), and sets another side of the read data RA perpendicular to the first reference side RS1 to a second reference side RS2 (see FIG. 6). For instance, the left side of the read data RA (one side extending in the main scanning direction) is set to the first reference side RS1, and the upper side of the read data RA (another side extending in the sub-scanning direction) is set to the second reference side RS2.

In Step S4, the control unit 4 performs a first distance detection process in which a first distance between the first reference side RS1 and the document image data G in the sub-scanning direction (a direction parallel to the second reference side RS2) is detected for each of the plurality of document image data G in the read data RA. Further, the control unit 4 performs a second distance detection process in which a second distance between the second reference side RS2 and the document image data G in the main scanning direction (a direction parallel to the first reference side RS1) is detected for each of the plurality of document image data G in the read data RA.

Here, with reference to FIG. 6, the first distance detection process and the second distance detection process are described focusing on the document image data GA1. Also for other document image data GA2 to GA16, the same method is used to detect the first distance and the second distance.

As illustrated in FIG. 6, the control unit 4 recognizes coordinates of a corner position GP closest to the first reference side RS1 among four corners of the document image data GA1, in a coordinate system having the first reference side RS1 as its Y axis and the second reference side RS2 as its X axis (a coordinate system having a region in the read data RA as its first quadrant), and recognizes the recognized position GP as a position of the document image data GA1 in the read data RA. In FIG. 6, the position GP of the document image data GA1 is shown by a black dot.

Further, the control unit 4 recognizes a distance D1 (X coordinate value) between the first reference side RS1 and the position GP in the sub-scanning direction as the first distance. In addition, the control unit 4 recognizes a distance D2 (Y coordinate value) between the second reference side RS2 and the position GP in the main scanning direction as the second distance.

With reference to FIG. 4 again, in Step S5, the control unit 4 performs a sorting process. In this case, the control unit 4 classifies the plurality of document image data G in the read data RA into groups based on first distances of the plurality of document image data G in the read data RA.

Figure 7:
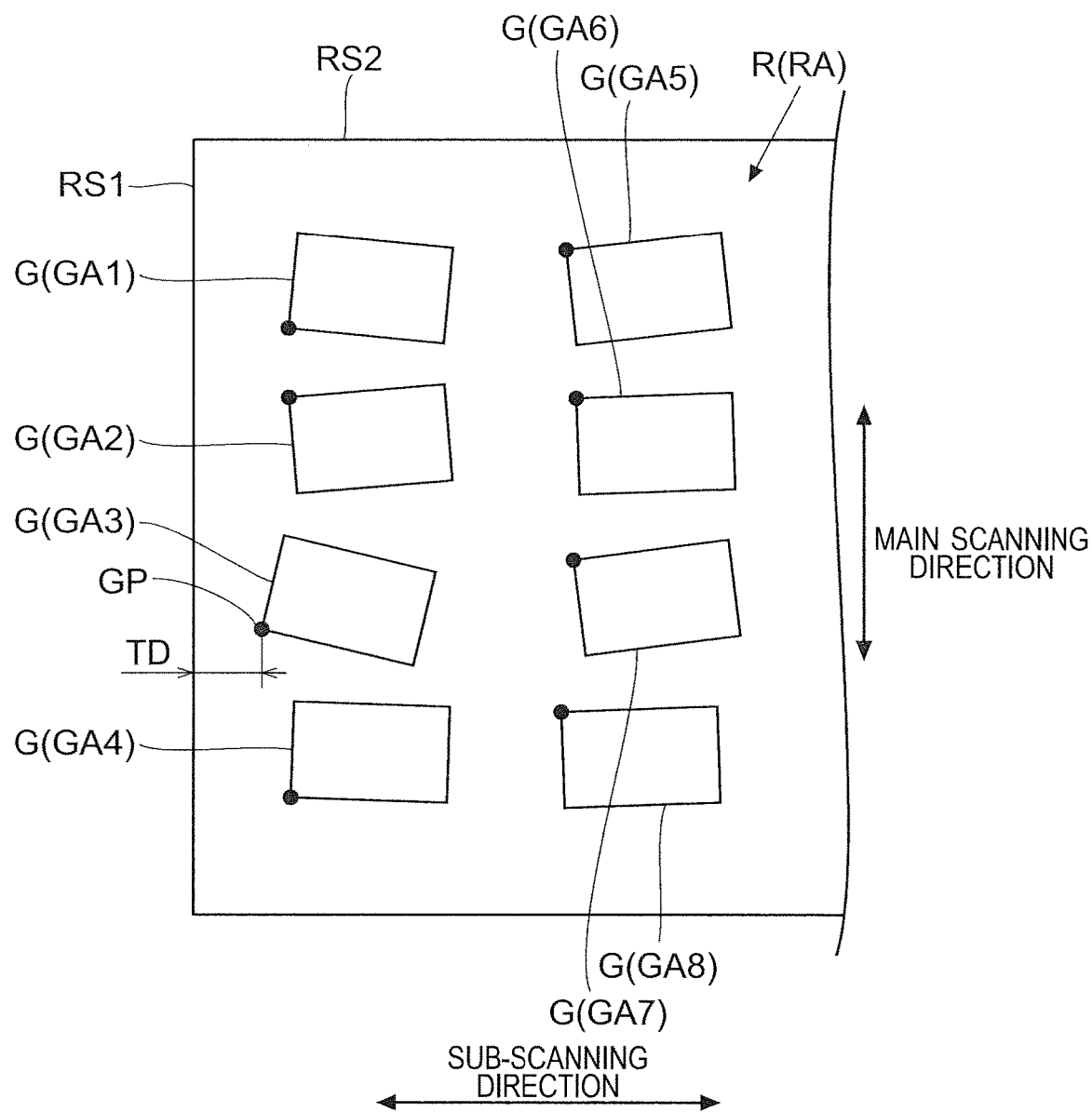
FIG. 7 is an explanatory diagram about a sorting process performed by the control unit of the image forming apparatus according to the one embodiment of the present disclosure.

As illustrated in FIG. 7, when performing the sorting process, the control unit 4 sets the shortest one among the first distances (between the first reference side RS1 and the position GP) of the plurality of document image data G in the read data RA to a target distance TD. Here, document image data GA1 to GA4 exist near the first reference side RS1, and the document image data GA3 among them has the shortest first distance. Therefore, the first distance of the document image data GA3 is recognized as the target distance TD.

In FIG. 7, positions GP of the plurality of document image data G in the read data RA are shown by black dots. Although there are black dots that are not denoted by symbol GP, every position shown by a black dot is the position GP. The same is true in FIG. 8 that will be referred to in the following description.

Figure 9:
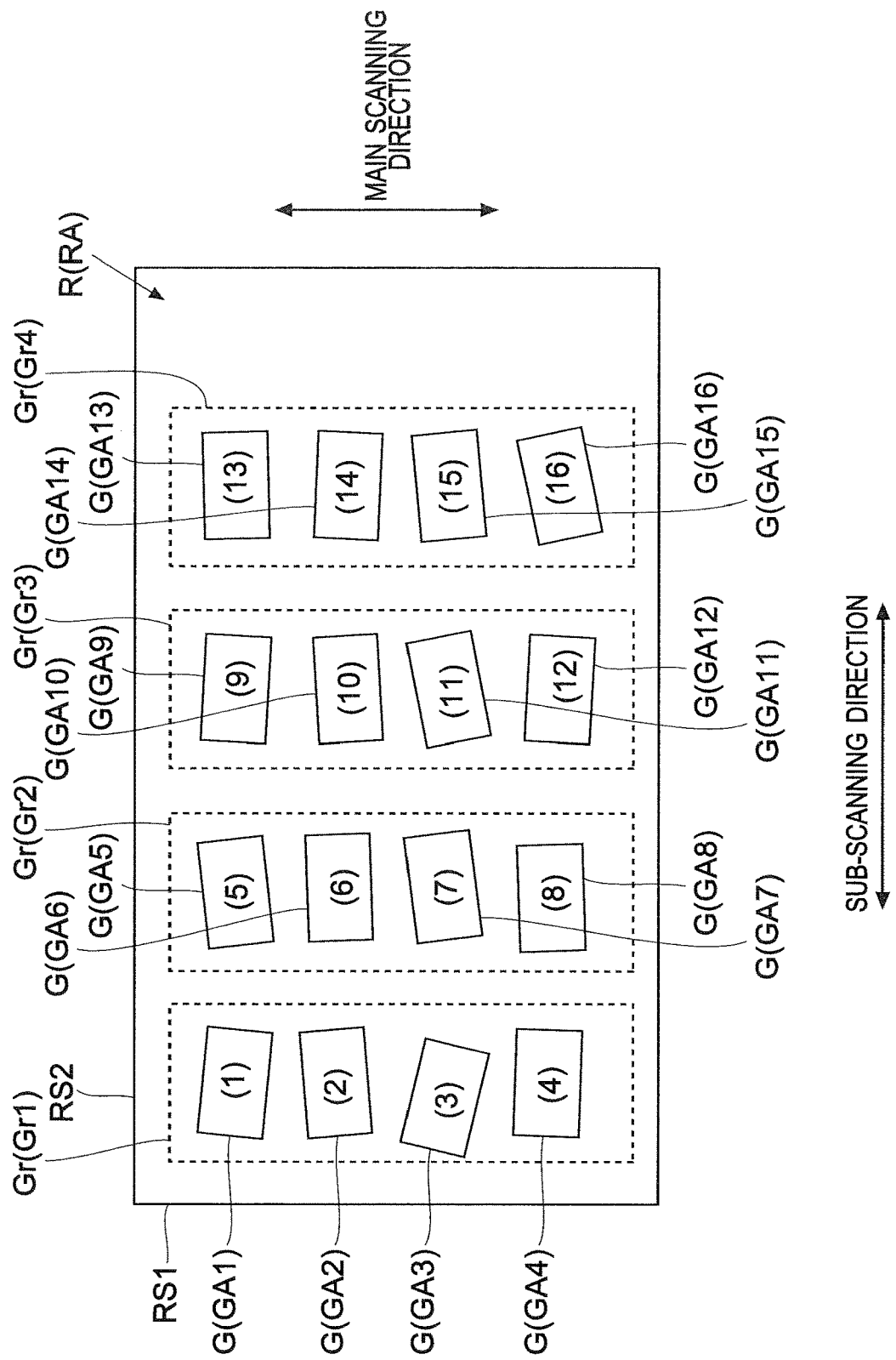
FIG. 9 is a diagram illustrating a result of the sorting process performed by the control unit of the image forming apparatus according to the one embodiment of the present disclosure.

After setting the target distance TD, the control unit 4 calculates a difference between the target distance TD and the first distance for each of the plurality of document image data G in the read data RA, and classifies document image data G having the calculated difference within a predetermined range (e.g. within 50 mm) into the same group Gr (see FIG. 9). Here, it is supposed that among the plurality of document image data G in the read data RA, the document image data GA1 to GA4 have corresponding differences within a predetermined range. In this case, the document image data GA1 to GA4 are classified into the same group Gr. Other document image data GA5 to GA16 are not classified into the group Gr to which the document image data GA1 to GA4 belong.

With reference to FIG. 4 again, in Step S6, the control unit 4 determines whether or not there are unclassified document image data G remaining in the read data RA. As a result, if the control unit 4 determines that there are unclassified document image data G remaining in the read data RA, the process flow proceeds to Step S5.

Figure 8:
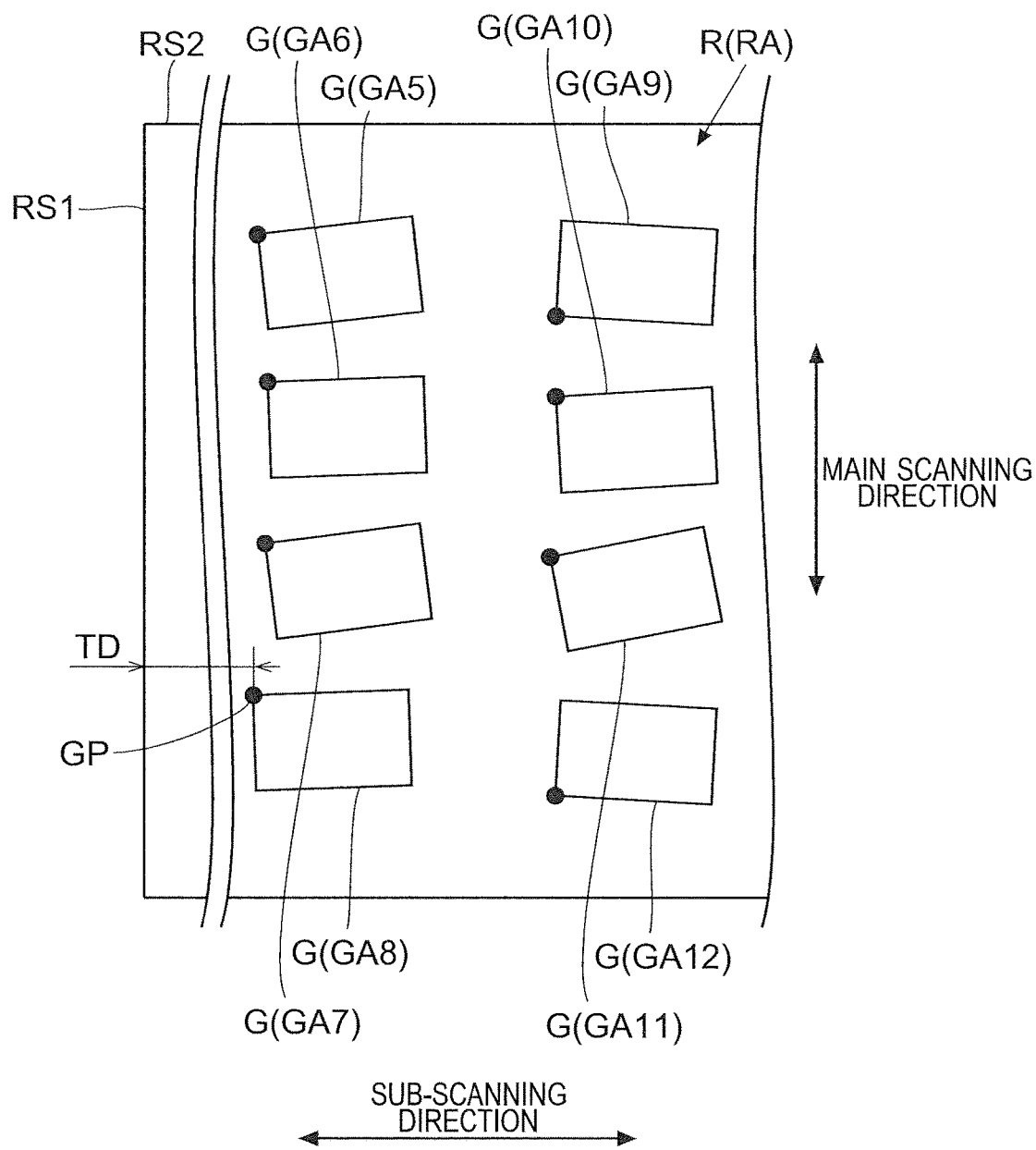
FIG. 8 is an explanatory diagram about the sorting process performed by the control unit of the image forming apparatus according to the one embodiment of the present disclosure.

In Step S5, the control unit 4 sets the shortest one among first distances of the unclassified document image data G in the read data RA to a new target distance TD (see FIG. 8). Then, the control unit 4 performs the sorting process again for the unclassified document image data G in the read data RA.

Here, at the time point when the document image data GA1 to GA4 are classified into the same group Gr, the document image data GA5 to GA16 remain as unclassified. In this case, the control unit 4 performs the sorting process again for the document image data GA5 to GA16.

As illustrated in FIG. 8, when performing the sorting process for the document image data GA5 to GA16, the control unit 4 set the shortest one among first distances of the document image GA5 to GA16 to a new target distance TD. Here, among the document image data GA5 to GA16, the document image data GA8 has the shortest first distance. Therefore, the first distance of the document image data GA8 is set to the target distance TD.

Further, the control unit 4 classifies document image data G having the corresponding differences within a predetermined range among the document image data GA5 to GA16 into the same group Gr. Here, it is supposed that among the document image data GA5 to GA16, the document image data GA5 to GA8 have corresponding differences within a predetermined range. In this case, the document image data GA5 to GA8 are classified into the same group Gr. Other document image data GA9 to GA16 and the already classified document image data GA1 to GA4 are not classified into the group Gr to which the document image data GA5 to GA8 belong.

At this time point, the document image data GA9 to GA16 remain as unclassified. Thus, the control unit 4 repeats the sorting process. Here, it is supposed that the plurality of document image data G in the read data RA are classified into four groups Gr (Gr1 to Gr4) as illustrated in FIG. 9. The document image data GA1 to GA4 belong to group Gr1. The document image data GA5 to GA8 belong to group Gr2. The document image data GA9 to GA12 belong to group Gr3. The document image data GA13 to GA16 belong to group Gr4.

With reference to FIG. 4 again, in Step S6, if the control unit 4 determines that there is no unclassified document image data G in the read data RA, the process flow proceeds to Step S7. In Step S7, the control unit 4 sets an output order of the plurality of document image data G in the read data RA based on the first distances (X coordinate values) and the second distances (Y coordinate values) of the plurality of document image data G in the read data RA.

Specifically, the control unit 4 sets the output order so as to output in order from the document image data G belonging to the group Gr closer to the first reference side RS1 among the groups Gr obtained by the sorting process. In other words, the control unit 4 outputs in order from the document image data G belonging to the group Gr closer to the first reference side RS1 among the groups Gr obtained by the sorting process. In addition, the control unit 4 sets the output order so as to output in order from the document image data G having the shorter second distance among the document image data G belonging to the same group Gr. In other words, the control unit 4 outputs in order from the document image data G having the shorter second distance among the document image data G belonging to the same group Gr.

In the example shown in FIG. 9, the groups Gr1, Gr2, Gr3, and Gr4 are arranged in this order from the first reference side RS1 to the opposite side. In other words, the group Gr closest to the first reference side RS1 is the group Gr1, the group Gr that is second closest to the same is the group Gr2, the group Gr that is third closest to the same is the group Gr3, and the group Gr that is farthest from the first reference side RS1 is the group Gr4. Therefore, the output order is set so that the document image data G belonging to the group Gr1, the document image data G belonging to the group Gr2, the document image data G belonging to the group Gr3, and the document image data G belonging to the group Gr4 are output in this order.

In addition, in the group Gr1, the document image data GA1, GA2, GA3, and GA4 are arranged in this order from the second reference side RS2 to the opposite side. In other words, the document image data GA1 has the shortest second distance (the smallest Y coordinate value), the document image data GA2 has the second shortest second distance (the second smallest Y coordinate value), the document image data GA3 has the third shortest second distance (the third smallest Y coordinate value), and the document image data GA4 has the longest second distance (the largest Y coordinate value). Therefore, in the group G1, the output order is set so that the document image data GA1, GA2, GA3, and GA4 are output in this order.

In the group Gr2, the output order is set so that the document image data GA5, GA6, GA7, and GA8 are output in this order. In the group Gr3, the output order is set so that the document image data GA9, GA10, GA11, and GA12 are output in this order. In the group Gr4, the output order is set so that the document image data GA13, GA14, GA15, and GA16 are output in this order.

In other words, the control unit 4 sets the output order so that the document image data GA1, GA2, GA3, GA4, GA5, GA6, GA7, GA8, GA9, GA10, GA11, GA12, GA13, GA14, GA15, and GA16 are output in this order. FIG. 9 shows the output order of the plurality of document image data GA1 to GA16 as numerals in parentheses.

With reference to FIG. 4 again, after the output order is set, the process flow proceeds to Step S8. In Step S8, the control unit 4 crops the plurality of document image data G from the read data RA.

In Step S9, the control unit 4 generates the output data of the plurality of document image data GA1 to GA16 so that the plurality of document image data GA1 to GA16 are output in the output order set in Step S7. For instance, the control unit 4 generates PDF data as the output data, in which the plurality of pages corresponding to the plurality of document image data GA1 to GA16 are combined into one file. In the example shown in FIG. 9, sixteen pages of PDF data respectively corresponding to the document image data GA1 to GA16 are generated so that the document image data GA1 to GA16 are output in this order.

Here, the storage unit 5 stores a preset upper limit number. The upper limit number can be arbitrarily changed. The operation panel 3 receives the change of the upper limit number from the user. There may be a case where the upper limit number is not set.

If the upper limit number is set, the control unit 4 does not crop the document image data G having an output order number larger than a predetermined number corresponding to the upper limit number. In other words, this document image data G is not output.

Figure 10:
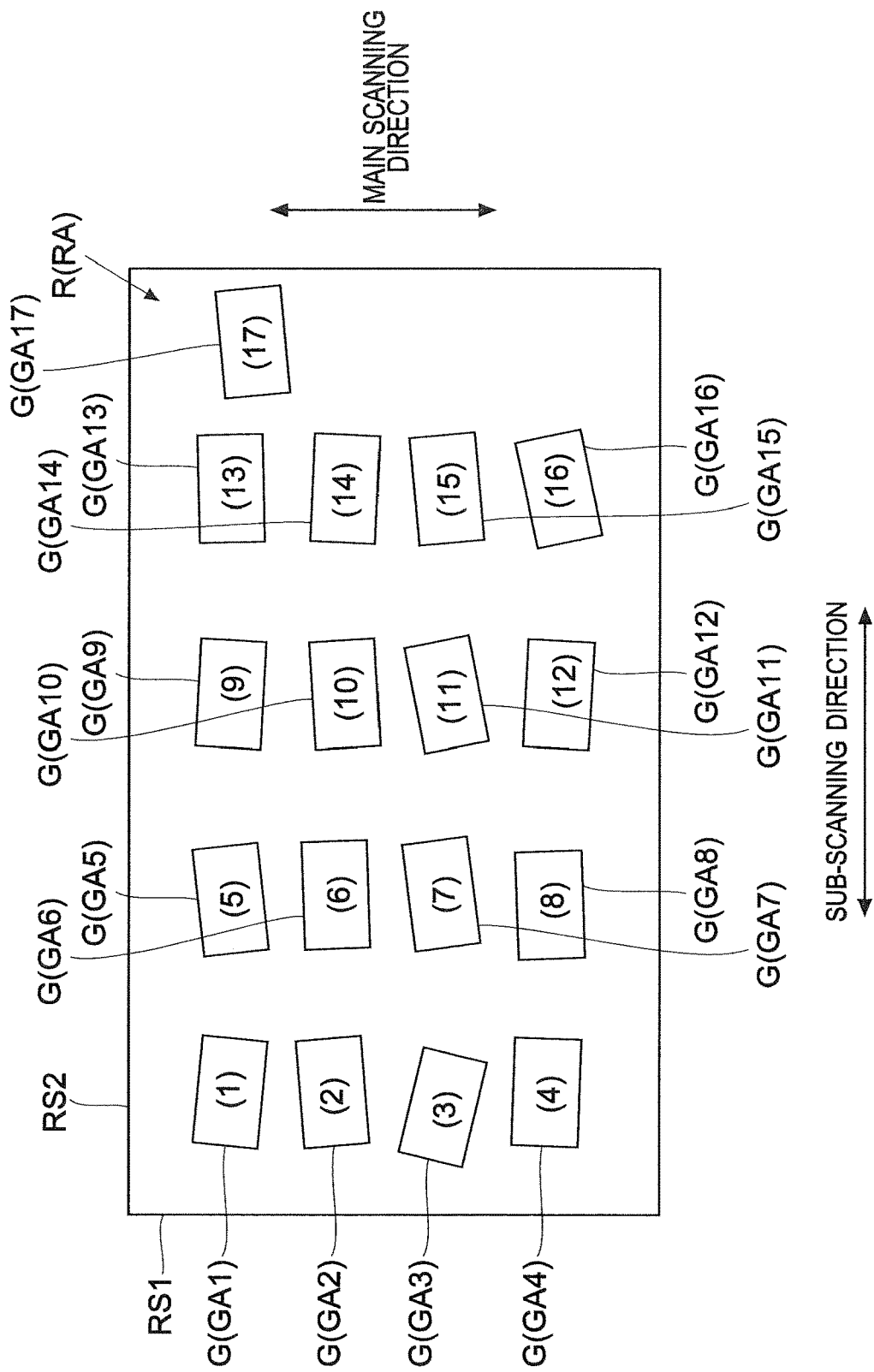
FIG. 10 is a diagram illustrating one example of read data generated by the image reader unit of the image forming apparatus according to the one embodiment of the present disclosure (in a case where the number of document image data exceeds an upper limit number).

For instance, it is supposed that document image data GA17 is further included in the read data RA shown in FIG. 5. The read data RA that further includes the document image data GA17 is shown in FIG. 10. In this example, the output order number of the document image data GA17 is set to 17.

In this case, if the upper limit number is set to "17" for example, all the document image data GA1 to GA17 are cropped from the read data RA. In contrast, if the upper limit number is set to "16", the document image data GA1 to GA16 are cropped from the read data RA. However, the document image data GA17 has the output order number (17) that is larger than a predetermined number (16) corresponding to the upper limit number, and hence the document image data GA17 is not cropped from the read data RA.

(Second Process)

Figure 11:
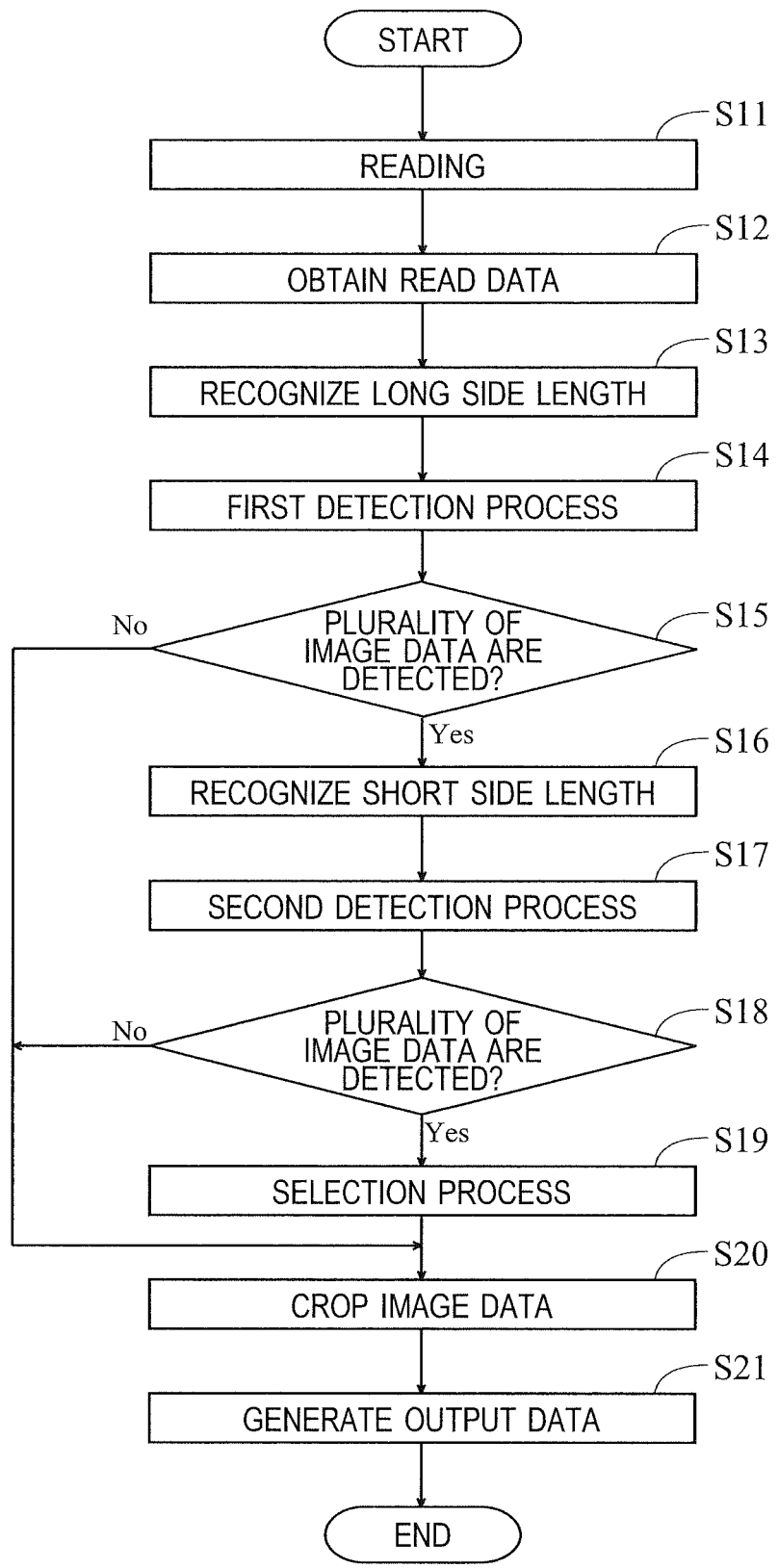
FIG. 11 is a flowchart illustrating a flow of a second process performed by the control unit of the image forming apparatus according to the one embodiment of the present disclosure.

With reference to the flowchart shown in FIG. 11, a flow of the second process performed by the control unit 4 is described below. It is supposed that the automatic crop function is enabled at the time when the flowchart shown in FIG. 11 starts. In addition, it is supposed that the single cropping mode is selected as the automatic crop function mode. In this state, when the operation panel 3 receives a request to execute a job from a user, the flowchart shown in FIG. 11 starts. Note that a plurality of (three) card documents D are placed on the contact glass CG at the time point when the flowchart shown in FIG. 11 starts.

Here, the single cropping mode is a mode in which one document image data G is cropped from one read data R. Therefore, if a plurality of card documents D are placed on the contact glass CG despite that the single cropping mode is selected as the automatic crop function mode, there is high possibility that the user has misplaced an unnecessary card document D on the contact glass CG.

In Step S11, the control unit 4 controls the image reader unit 1 to read the plurality of card documents D. After that, In Step S12, the control unit 4 obtains the read data R (see FIG. 12) obtained by reading by the image reader unit 1. In this case, the read data R obtained by the control unit 4 includes the plurality of document image data G respectively corresponding to the plurality of card documents D placed on the contact glass CG (see FIG. 12). In other words, the control unit 4 detects plurality of document image data G from the read data R.

Figure 12:
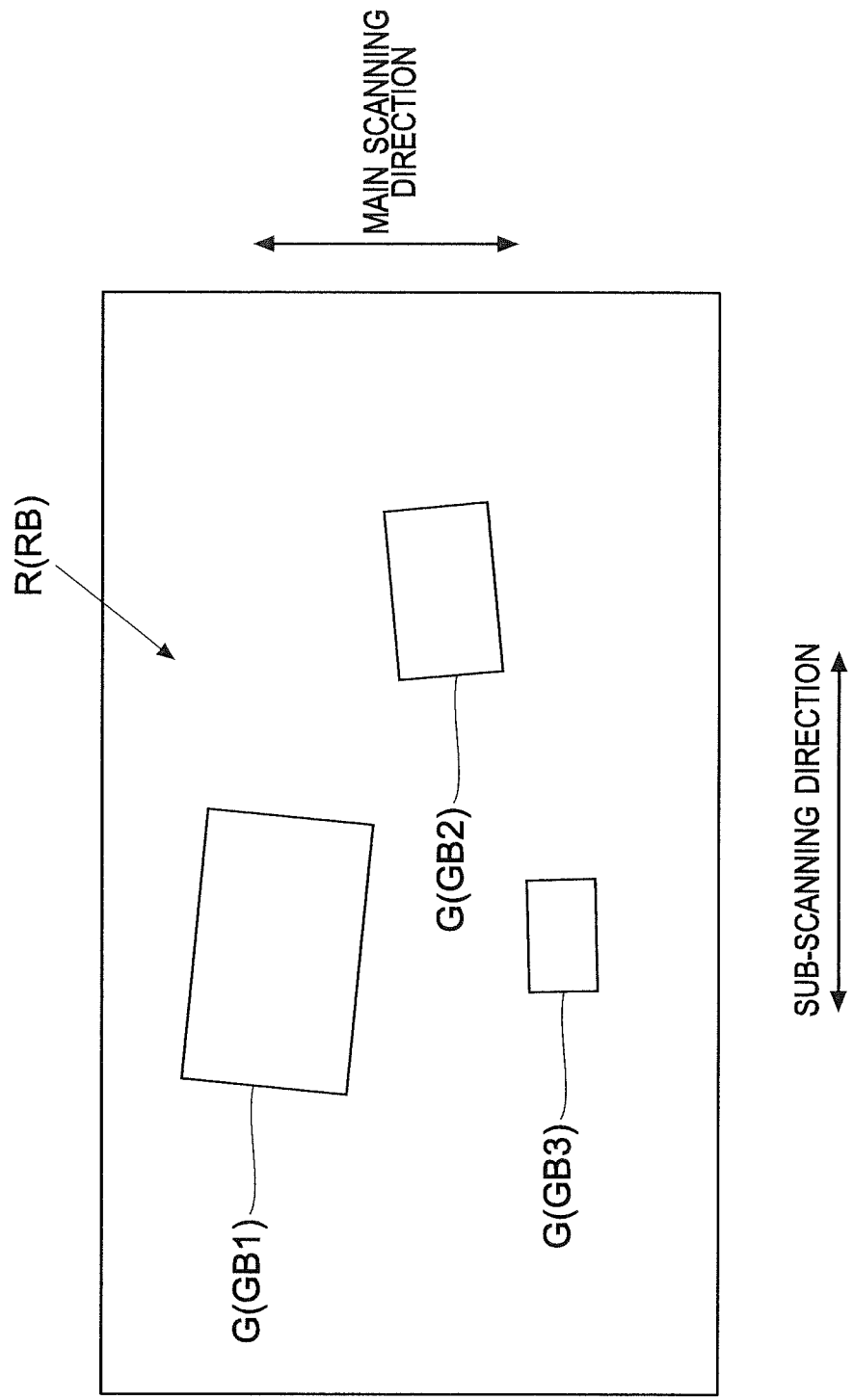
FIG. 12 is a diagram illustrating one example of read data generated by the image reader unit of the image forming apparatus according to the one embodiment of the present disclosure (an explanatory diagram of the second process).

In the following description, the read data R obtained at this time is denoted by symbol RB. In addition, the plurality of document image data G in the read data RB may be denoted by symbols GB1 to GB3 for description. FIG. 12 shows the read data RB.

In Step S13, the control unit 4 recognizes lengths of long sides of the plurality of document image data G in the read data RB. Further, in Step S14, the control unit 4 performs a first detection process of detecting the document image data G having the longest long side among the plurality of document image data G in the read data RB.

In Step S15, the control unit 4 determines whether or not a plurality of document image data G are detected in the first detection process. As a result, if the control unit 4 determines that a plurality of document image data G are detected in the first detection process, the process flow proceeds to Step S16. For instance, if a plurality of card documents D having the same long side length are set as reading targets, and if a card document D having a long side longer than that of the plurality of card documents D is not set as a reading target, the process flow proceeds to Step S16.

In Step S16, the control unit 4 recognizes lengths of short sides of the plurality of document image data G detected in the first detection process. Further, in Step S17, the control unit 4 performs a second detection process of detecting the document image data G having the longest short side among the plurality of document image data G detected in the first detection process.

In Step S18, the control unit 4 determines whether or not a plurality of document image data G are detected in the second detection process. As a result, if the control unit 4 determines that a plurality of document image data G are detected in the second detection process, the process flow proceeds to Step S19. For instance, if a plurality of card documents D having the same size (the same long side length and the same short side length) are set as reading targets, and if a card document D having a size larger than that of the plurality of card documents D is not set as a reading target, the process flow proceeds to Step S19.

In Step S19, the control unit 4 performs a selection process in which one document image data G to be output is selected from the plurality of document image data G detected in the second detection process. The selection process is a first selection process or a second selection process. The user sets in advance which one of the first selection process and the second selection process should be performed.

When performing the first selection process, the control unit 4 performs an edge enhancement process using a differentiation filter or the like on each of the plurality of document image data G detected in the second detection process, so as to detect edge pixels (pixels constituting edges of images corresponding to characters, figures, and the like in the card document D). In addition, the control unit 4 detects the number of the edge pixels in the document image data G for each of the plurality of document image data G detected in the second detection process.

Further, the control unit 4 selects the document image data G having the largest number of edge pixels among the plurality of document image data G detected in the second detection process. In this way, the document image data G is selected, which corresponds to the card document D having the largest number of characters and figures among the plurality of document image data G detected in the second detection process.

When performing the second selection process, the control unit 4 generates a plurality of preview images (images for display) respectively corresponding to the plurality of document image data G detected in the second detection process. Further, the control unit 4 controls the operation panel 3 to receive a selection operation of selecting one document image data G to be output among the plurality of document image data G detected in the second detection process.

The operation panel 3 displays a plurality of preview images as choices and receives the selection operation by the user. For instance, the operation panel 3 receives the selection operation, which is an operation of touching a display region of one of the plurality of preview images. When the operation panel 3 receives the selection operation, the control unit 4 selects the document image data G corresponding to the preview image selected in the selection operation.

After the document image data G is selected, the process flow proceeds to Step S20. If the control unit 4 determines in Step S15 that there is one document image data G detected in the first detection process, the process flow also proceeds to Step S20. In addition, if the control unit 4 determines in Step S18 that there is one document image data G detected in the second detection process, the process flow also proceeds to Step S20.

When the process flow proceeds from Step S15 to Step S20, the control unit 4 crops the one document image data G detected in the first detection process from the read data RB. When the process flow proceeds from Step S18 to Step S20, the control unit 4 crops the one document image data G detected in the second detection process from the read data RB. When the process flow proceeds from Step S19 to Step S20, the control unit 4 crops the one document image data G selected in the selection process from the read data RB.

In Step S21, the control unit 4 generates the output data of the document image data G cropped from the read data RB. For instance, PDF data of one page corresponding to the document image data G cropped from the read data RB is generated.

In the example shown in FIG. 12, among the plurality of document image data G included in the read data RB, the document image data GB1 has the longest long side. Therefore, in the first detection process, the document image data GB1 is detected, while the document image data GB2 and GB3 are not detected. In this way, only the document image data GB1 is cropped from the read data RB (only the document image data GB1 is output).

Although not illustrated, if any document image data G having the same long side length as the document image data GB1 is included in the read data RB, the second detection process is performed, and only the document image data G having a longer short side is cropped from the read data RB. In addition, if any document image data G having the same long side length and the same short side length as the document image data GB1 is included in the read data RB, the selection process is performed, and only the document image data G selected in the selection process is cropped from the read data RB.

The image forming apparatus 100 of this embodiment includes the image reader unit 1 that reads the document D placed on the contact glass CG so as to generate the read data R including the document image data G, and the control unit 4 that performs the cropping process of cropping the document image data G from the read data R so as to generate the output data of the document image data G cropped in the cropping process. When performing, as the cropping process, the first process in which the plurality of document image data G are cropped from the read data R, the control unit 4 sets one side of the read data R to the first reference side RS1, and sets another side of the read data R perpendicular to the first reference side RS1 to the second reference side RS2, and for each of the plurality of document image data G, the control unit 4 detects the first distance between the first reference side RS1 and the document image data G in the direction parallel to the second reference side RS2 and the second distance between the second reference side RS2 and the document image data G in the direction parallel to the first reference side RS1, and sets the output order of the plurality of document image data G based on the first distances and the second distances of the plurality of document image data G.

In the structure of this embodiment, the output order is set based on the first distance and the second distance, and hence the output order changes corresponding to placing positions of the documents D on the contact glass CG. In this way, by adjusting the placing positions of the documents D on the contact glass CG, the user can output the plurality of document image data G (can obtain the output data of the plurality of document image data G) in a desired order. As a result, convenience for the user is improved.

In addition, in this embodiment, as described above, the control unit 4 performs the sorting process of classifying the plurality of document image data G into groups based on the first distances of the plurality of document image data G, and outputs in order from the document image data G belonging to the group Gr closer to the first reference side RS1 (the document image data G corresponding to the document D placed closer to the left side of the contact glass CG) among the groups Gr obtained by the sorting process. In this way, by placing the document D corresponding to the document image data G to be output earlier at a position closer to the left side of the contact glass CG, the user can set the output order of the document image data G to be earlier.

In addition, in this embodiment, as described above, the control unit 4 outputs in order from the document image data G having a shorter second distance (the document image data G corresponding to the document D placed closer to the upper side of the contact glass CG) among the document image data G belonging to the same group Gr. In this way, by placing the document D corresponding to the document image data G to be output earlier at a position closer to the left side and closer to the upper side of the contact glass CG, the user can set the output order of the document image data G to be earlier. For instance, if the user wants to output first the document image data G corresponding to a certain document D, the document D should be placed on the upper left corner of the contact glass CG.

In addition, in this embodiment, as described above, when performing the sorting process, the control unit 4 sets the shortest first distance among the first distances of the plurality of document image data G to the target distance TD, calculates the difference between the target distance TD and the first distance for each of the document image data G, and classifies the document image data G having the calculated difference within a predetermined range to the same group Gr. In this way, even if the placing positions of the documents D of one row arranged in the main scanning direction are a little deviated from each other in the sub-scanning direction, the document image data G of one row corresponding to the documents D of one row are classified into the same group Gr.

In addition, in this embodiment, as described above, as a result of the sorting process, if there are unclassified document image data G, the control unit 4 sets the shortest first distance among the first distances of the unclassified document image data G to a new target distance TD, and performs the sorting process again for the unclassified document image data G. In this way, even if the plurality of document image data G arranged in a matrix are included in the read data R (see FIG. 5), the plurality of document image data G are classified into groups Gr corresponding to the first distances thereof.

In addition, in this embodiment, as described above, the control unit 4 does not crop the document image data G having an output order number larger than a predetermined number corresponding to the upper limit number from the read data R. In this way, output of the document image data G exceeding the upper limit number is suppressed.

In addition, in this embodiment, as described above, when performing the second process as the cropping process, if the plurality of document image data G are included in the read data R, the control unit 4 recognizes the long side lengths of the plurality of document image data G, performs the first detection process of detecting the document image data G having the longest long side among the plurality of document image data G, and crops the document image data G detected in the first detection process from the read data R.

Further, when detecting the plurality of document image data G in the first detection process, the control unit 4 recognizes short side lengths of the plurality of document image data G detected in the first detection process, performs the second detection process of detecting the document image data G having the longest short side among the plurality of document image data G detected in the first detection process, and crops the document image data G detected in the second detection process from the read data G.

In this way, by performing the first detection process and the second detection process, only the document image data G corresponding to the document D having a largest size among the plurality of documents D placed on the contact glass CG is output. In this way, for example, in the example shown in FIG. 12, if the user's desired document image data G (the document image data G to be output) is the document image data GB1, the document image data GB2 and GB3 are not output unnecessarily. In addition, even if there is a small piece of paper (garbage) on the contact glass CG, image data of the garbage can be prevented from being output.

In addition, in this embodiment, as described above, in the case where the plurality of document image data G are detected in the second detection process, when performing the first selection process as the selection process, the control unit 4 detects the number of edge pixels existing in the document image data G for each of the plurality of document image data G detected in the second detection process, and crops the document image data G having the largest number of edge pixels among the plurality of document image data G detected in the second detection process from the read data R (selects the document image data G). In this way, the document image data G corresponding to the document D having the most characters and figures can be output.

In addition, in this embodiment, as described above, in the case where the plurality of document image data G are detected in the second detection process, when performing the second selection process as the selection process, the control unit 4 controls the operation panel 3 to receive the selection operation of selecting the document image data G to be output among the plurality of document image data G detected in the second detection process, and crops the document image data G selected in the selection operation from the read data R (selects the document image data G). In this way, an error such that document image data G that is not the user's desired document image data G is output does not occur.

The embodiment disclosed above is merely an example in every aspect and should not be understood as a limitation. The scope of the present disclosure is defined not by the above description of the embodiment but by the claims, and should be understood to include all modifications within the meanings and scope equivalent to the claims.

What is claimed is:

1. An image forming apparatus comprising:
   an image reader unit arranged to read a document placed on a contact glass so as to generate read data including image data of the document; and
   a control unit arranged to perform a cropping process of cropping the image data from the read data so as to generate output data of the image data cropped in the cropping process, wherein
   when performing, as the cropping process, a first process in which a plurality of image data are cropped from the read data, the control unit sets one side of the read data to a first reference side and sets another side perpendicular to the first reference side of the read data to a second reference side, and for each of the plurality of image data, the control unit detects a first distance between the first reference side and the image data in a direction parallel to the second reference side, and a second distance between the second reference side and the image data in a direction parallel to the first reference side, and sets an output order of the plurality of image data based on the first distances and the second distances of the plurality of image data.

2. The image forming apparatus according to claim 1, wherein the control unit performs a sorting process of classifying the plurality of image data into groups based on the first distances of the plurality of image data, and outputs in order from the image data belonging to the group closer to the first reference side among the groups obtained by the sorting process.

3. The image forming apparatus according to claim 2, wherein the control unit outputs in order from the image data having a shorter second distance among the image data belonging to the same group.

4. The image forming apparatus according to claim 2, wherein when performing the sorting process, the control unit sets the shortest first distance among the first distances of the plurality of image data to the target distance, calculates a difference between the target distance and the first distance for each of the image data, and classifies the image data having the difference within a predetermined range to the same group.

5. The image forming apparatus according to claim 4, wherein if there are unclassified image data as a result of the sorting process, the control unit sets the shortest first distance among the first distances of the unclassified image data to a new target distance, and performs the sorting process again for the unclassified image data.

6. The image forming apparatus according to claim 1, wherein if an upper limit number is set in advance, the control unit does not crop the image data having an output order number larger than a predetermined number corresponding to the upper limit number.

7. The image forming apparatus according to claim 1, wherein when performing, as the cropping process, a second process in which one image data is cropped from the read data, if a plurality of image data are included in the read data, the control unit recognizes long side lengths of the plurality of image data, performs a first detection process of detecting the image data having the longest long side among the plurality of image data, and crops the image data detected in the first detection process from the read data.

8. The image forming apparatus according to claim 7, wherein when detecting the plurality of image data in the first detection process, the control unit recognizes short side lengths of the plurality of image data detected in the first detection process, performs a second detection process of detecting the image data having the longest short side among the plurality of image data detected in the first detection process, and crops the image data detected in the second detection process from the read data.

9. The image forming apparatus according to claim 8, wherein in the case where the plurality of image data are detected in the second detection process, the control unit detects the number of edge pixels existing in the image data for each of the plurality of image data detected in the second detection process, and crops the image data having the largest number of edge pixels among the plurality of image data detected in the second detection process from the read data.

10. The image forming apparatus according to claim 8, further comprising an operation panel arranged to receive an operation from a user, wherein
in the case where the plurality of image data are detected in the second detection process, the control unit controls the operation panel to receive a selection operation of selecting the image data to be output among the plurality of image data detected in the second detection process, and crops the image data selected in the selection operation from the read data.

\* \* \* \* \*